United States Patent Office 3,359,021
Patented Dec. 19, 1967

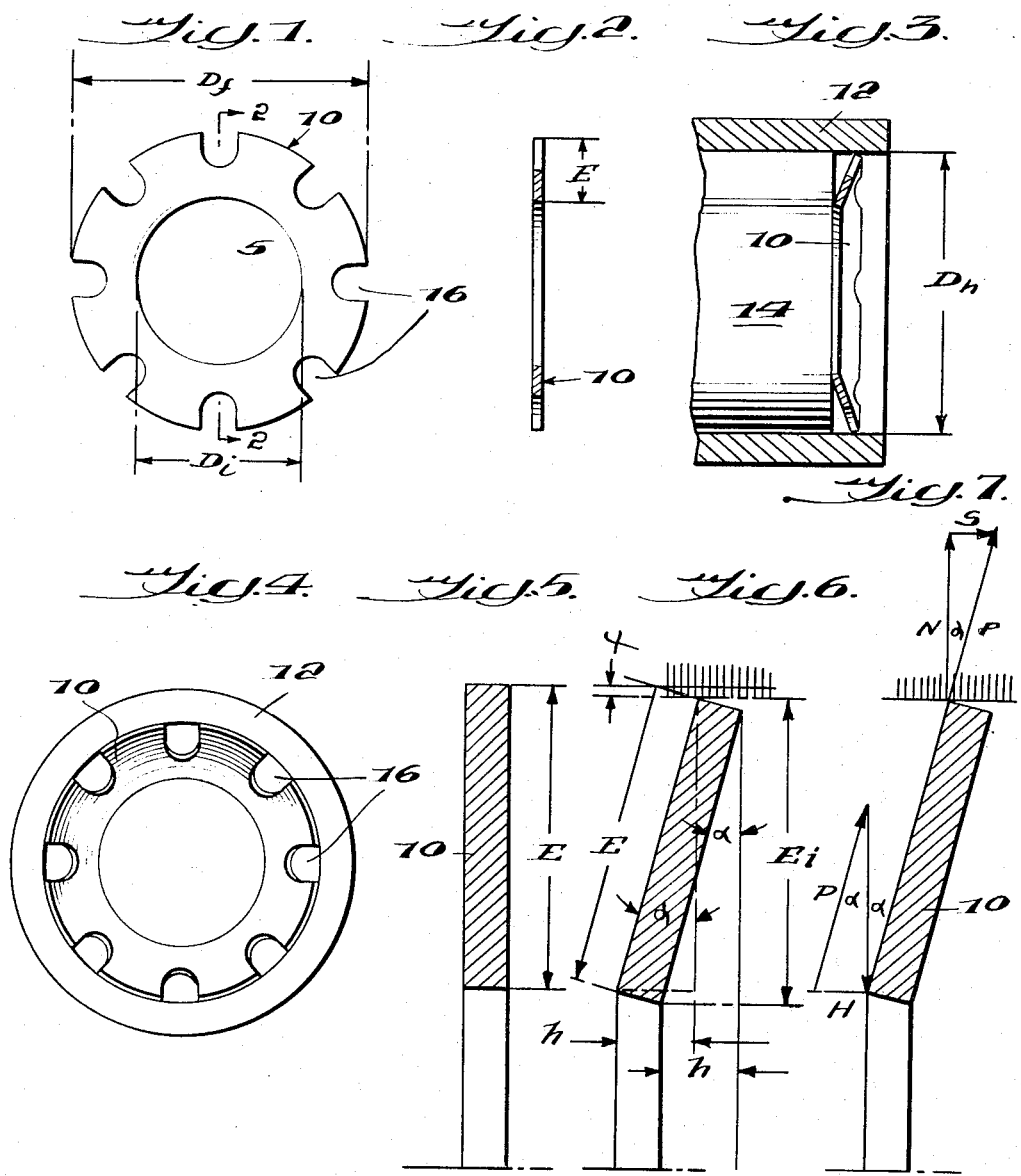

3,359,021
SELF-LOCKING RETAINING RINGS
Hugo Wurzel, Bronx, and Howard Roberts, Great Neck,
N.Y., assignors to Waldes Kohinoor, Inc., Long Island
City, N.Y., a corporation of New York
Filed June 3, 1965, Ser. No. 461,061
3 Claims. (Cl. 287—126)

This invention relates to improvements in self-locking retaining rings, and more particularly to an improved self-locking retaining ring of the internal type, i.e., for assembly in the bore of a housing or like carrier member wherein it is adapted to provide an artificial locating shoulder for a machine part such as a gear, bearing race, etc.

The self-locking retaining ring of the prior art (internal type) traditionally was formed with resilient prongs which project radially outwardly from a fully closed plane ring body at an initial inclination thereto, the prongs being designed to yield in direction as to increase such initial inclination during the course of ring assembly within the housing bore, and to tend to straighten when thrust is exerted on the ring body in the opposite direction by the machine part being held, as causes the outer ends of the prongs to bite into and grip to the metal making up the peripheral surface of the housing bore. While having the advantage by requiring no seating groove as do retaining rings of the split and open-ended types, the known self-locking ring characterized as in the foregoing has relatively low holding power and hence its use is recommended only in assemblies wherein low to moderate thrust loads are anticipated. Moreover, the range of application of the pronged self-locking retaining ring is further restricted to those assemblies wherein the metal of the housing, in whose bore the ring is to be mounted, is relatively soft as compared to the metal from which the ring is fashioned, since otherwise the free ends of the prongs cannot bite into and secure themselves to the housing bore surface as intended.

Stated broadly, an object of the invention is the provision of a self-locking internal retaining ring which not only is capable of taking substantially higher thrust loads than possible with the known prong-type self-locking rings, but also is effective in applications requiring that the housing in whose bore the ring is assembled be of hard metal, i.e. of metal having hardness approaching that of the hardened metal of the ring itself.

A more particular object of the invention is the provision of a self-locking retaining ring which is capable of taking high thrust loads which are calculatable in advance, thereby to remove any uncertaintly as respects the loads that the ring will take in use.

Another object of the invention is the provision of an effective self-locking spring retaining ring having those characteristics of Belleville spring washer as enables its load and deflection characteristic to be determined by calculation.

A further object of the invention is the provision of a simplified yet effective and practical internal-type self-locking retaining ring which initially has the form of a plane ring body devoid of prongs and which is so designed as to be adapted, during the course of its assembly in a housing bore, to be deformed to the shape of a truncated cone and thereby to acquire certain characteristics of a Belleville spring washer, particularly load-resistance and deflection characteristics.

The above and the objects and features of advantage of the improved self-locking retaining ring of the present invention will be apparent from the following detailed description thereof, taken with the accompanying illustrative drawing, wherein:

FIG. 1 is a plan view of said improved ring and FIG. 2 is a section taken on line 2—2 thereof, both said views showing the plane form of the ring prior to assembly;

FIG. 3 is a cross-sectional view and FIG. 4 an end view showing a ring according to FIGS. 1 and 2 assembled in a housing bore;

FIGS. 5 and 6 are enlarged upper-half sectional views illustrating a ring of the invention in the unstressed and stressed conditions thereof, respectively, the views having pertinent mathematical symbols applied thereto; and FIG. 7 is a view similar to FIG. 6 but including force diagrams not therein shown.

Referring to the drawing, a self-locking retaining ring of the invention as fabricated and up to the instant of its assembly comprises a plane-form closed ring body 10 having a free (unstressed) outer diameter $D_f$ and section height E. Referring to FIGS. 2 and 3, the ring body 10 is adapted to be assembled in the bore of a housing 12 having internal diameter $D_h$ which is less than that of the free or unstressed ring diameter by the amount $D_f - D_h$. Thus, when the initially plane-form ring body 10 is assembled within the bore of the housing 12, by being forced thereinto to the axial extent that its inner edge abuts against a machine part 14 whose axial location within the bore is to be fixed by said ring, it (said ring body) assumes the shape of a truncated cone having height $h$, whose larger-end diameter equals $D_h$, whose section height is effectively $E_1$, and whose angle of conicity is $\alpha$.

Thus, in practical effect, the assembled ring takes on the shape of a Belleville spring washer, and will function similarly thereto, with the difference that whereas the Belleville spring washer, not being confined within a housing, is relatively free to expand with deflection under load, the ring of the invention, acting as an internal retaining ring confined within the bore of the housing 12, is unable to expand and hence frictionally secures itself to the housing bore surface with a force which increases as the load applied thereto by the machine part increases. Accordingly, the now conical body of the ring will transmit the load applied against its inner (smaller diameter) end to the inner wall of the housing.

Since a ring of the invention when assembled as aforesaid acts as a Belleville spring washer, the same method of calculating load-deflection characteristics may be employed for both. Thus, the load-deflection formula for the instant ring may be that for the Belleville spring washer, as the latter is set forth in detail in "Transactions of the American Society of Mechanical Engineers," May 1936, vol. 58, Almen and Laszlo, and more recently in "Handbook of Mechanical Spring Design," 1965, pp. 70–73, published by the Associated Spring Corporation, Bristol, Connecticut. Accordingly, by the use of the formulae set forth in the foregoing authorities, the load-taking and deflection characteristics of the self-locking ring of the invention may be determined in advance by calculation.

However, it is necessary to make sure that the ring does not slip in the housing 12 under the calculated load. This can be prevented by selecting the angle $\alpha$ according to the following formulation (FIGS. 5, 6, 7):

(1) $$\frac{H}{P} = \sin \alpha$$

(2) $$P = \frac{H}{\sin \alpha}$$

(3) $$\frac{N}{P} = \cos \alpha$$

(4) $$N = P \cos \alpha$$

$$(5) \quad N = \frac{S}{\tan \alpha}$$

$$(6) \quad S = N \tan \alpha$$

$$(7) \quad N\mu > S$$

$$(8) \quad N\mu > N \tan \alpha$$

and $$(9) \quad \mu > \tan \alpha$$

In the above formulae:

$\mu$=the friction co-efficient between ring and housing;
$N$=the normal component of force against wall of housing;
$H$=the force acting on the ring in axial direction;
$P$=the component of force H in the direction of angle $\alpha$; and
$S$=the axial component of force H.

Thus, it will be seen that the largest permissible angle $\alpha$ after assembly should be such that the tangent of this angle is smaller than the friction co-efficient between ring and housing (tan $\alpha < \mu$). Since, in applying the load H, the angle $\alpha$ becomes smaller due to the elastic deformation of the ring, the safety against slipping is increased, thus allowing loads up to the limit of the ring material. As previously explained, these loads can be calculated in advance, just as with a Belleville spring washer.

The action of a self-locking retaining ring according to the invention when in the stressed or assembled condition will, it is believed, be readily understood from a consideration of the force diagrams of FIG. 7. In said view, if H is the force or load acting on the ring in axial direction, the resultant load P is $H$:sin $\alpha$. Since $\alpha$ is very small, the resultant load may become very great. When so loaded, the ring will tend to flatten, thereby reducing the angle $\alpha$ even more and therefore increasing the load capacity of the ring still more.

FIG. 7 also shows that the resultant force P can be resolved into its two components N and S. If N times the friction coefficient $\mu$ between the ring outer edge and the housing-bore surface is greater than S, the ring is self-locking. This is true even if the ring made of steel is used in a hardened steel housing. Such condition can be compared to a beam fixed on both ends. As is well known, deflection of such a beam is much smaller than the deflection of a beam with free supports.

Reverting to FIGS. 1 and 4 in particular, such illustrate that the ring body is preferably provided in its outer edge with outwardly opening recesses 16, the provision of which renders the ring more flexible in its outer rim portion than if no such recesses were provided. Generally speaking, the size and number of the recesses are directly proportional to ring thickness and to the magnitude of the distance $f$ indicated in FIG. 6, i.e., half the difference between free ring diameter $D_f$ and housing bore diameter $D_h$. The greater flexibility of the ring achieved by said recesses 16 of course makes for ease in ring assembly and also in the initially plane ring body taking on a conical shape during the course of its assembly. Said recesses also in effect provide working tolerances in both housing bore and ring diameters.

Although not illustrated, it is also within the purview of the invention, should still greater flexibility in the ring body than that afforded by the outer edge recesses 16 be desired, to form recesses along the inner edge of the ring also. Preferably, such inner edge recesses, if provided, would be staggered relatively to the outer-edge recesses, thus to avoid undue removal of the metal of the ring from radially aligned outer- and inner edge areas thereof.

Without further analysis, it will be appreciated that a self-locking retaining ring as described and illustrated herein achieves the objects of the invention set forth above. However, it is intended that all matter contained in this description or shown in the accompanying drawing shall be interpreted as illustrative and not in a limiting sense.

We claim:

1. A retaining ring assembly comprising a housing having a bore, a machine part disposed in said bore, and a self-locking retaining ring engaged with the bore surface along its outer edge and abutting against a radial face of said machine part along its inner edge, thereby providing in said bore an artificial shoulder for axially locating the machine part therein, said retaining ring comprising an annular, initially planar, closed ring body having an unstressed external diameter greater than that of said bore by a predetermined amount but being in a radially confined and thereby stressed state within the bore and having the frusto-conical configuration of a Belleville spring washer of external diameter equal to that of said bore and a coning angle such that the tangent of said angle is smaller than the friction coefficient between the outer edge of the ring and the housing bore surface, said ring body being secured in place within the bore solely by friction exerted by its outer edge on the bore surface consequent to the ring body tending to return to its initial planar shape and which increases as the ring tends to deflect under a load applied in the same direction as its return-movement tendency by said machine part.

2. A retaining ring assembly according to claim 1, wherein the ring body is provided along at least one of its edges with a plurality of recesses serving to increase its flexibility and thereby its ability to assume its stressed state as aforesaid.

3. A retaining ring assembly according to claim 2, wherein the recesses are provided along the external edge of said ring body, and the size and number thereof are directly proportional to ring thickness and to half the difference between the external diameter of the ring body in the unstressed state and the diameter of the housing bore.

References Cited

UNITED STATES PATENTS

| | | | |
|---|---|---|---|
| 1,556,241 | 10/1925 | Mueller | 285—340 |
| 2,236,031 | 3/1941 | Hall | 285—340 |
| 2,712,262 | 7/1955 | Knohl | 85—36 |
| 2,781,940 | 2/1957 | Schlage et al. | 85—35 |
| 2,798,748 | 7/1957 | Maurer | 287—52 |

FOREIGN PATENTS 780,237  7/1957  Great Britain.

CARL W. TOMLIN, *Primary Examiner.*

W. L. SHEDD, *Examiner.*